United States Patent
Atkinson

(10) Patent No.: US 7,680,961 B2
(45) Date of Patent: Mar. 16, 2010

(54) DEVICE RECOGNITION SYSTEM AND METHOD

(75) Inventor: Lee Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 11/259,569

(22) Filed: Oct. 25, 2005

(65) Prior Publication Data

US 2007/0094423 A1    Apr. 26, 2007

(51) Int. Cl.
G06F 3/00 (2006.01)
(52) U.S. Cl. .................................. 710/16; 710/19
(58) Field of Classification Search ............... 710/16; 370/241
See application file for complete search history.

(56) References Cited

U.S. PATENT DOCUMENTS

| | | | | |
|---|---|---|---|---|
| 3,727,193 A | * | 4/1973 | Bolie | 382/228 |
| 3,816,708 A | * | 6/1974 | Walton | 340/5.8 |
| 4,714,875 A | * | 12/1987 | Bailey et al. | 324/73.1 |
| 4,792,986 A | | 12/1988 | Garner et al. | |
| 5,760,596 A | * | 6/1998 | Peiffer et al. | 324/715 |
| 6,628,771 B1 | * | 9/2003 | Frise et al. | 379/215.01 |
| 2003/0164695 A1 | * | 9/2003 | Fasshauer et al. | 324/76.21 |
| 2004/0081099 A1 | * | 4/2004 | Patterson et al. | 370/241 |

FOREIGN PATENT DOCUMENTS

JP    S62188524    8/1987
JP    S6117047    10/1992

OTHER PUBLICATIONS

Audio Codes '97, Revision 2.3 Revision 1.0, Apr. 2002, Intel, 108 pgs.
JP Official Action dated Sep. 15, 2009, pp. 2.

* cited by examiner

Primary Examiner—Henry W. H. Tsai
Assistant Examiner—John B Roche

(57) ABSTRACT

A device recognition system comprises an identification module of a computer device configured to generate an impedance signature for an external device using an impedance of the external device measured at least two different stimuli, the impedance signature used to identify the external device.

32 Claims, 4 Drawing Sheets

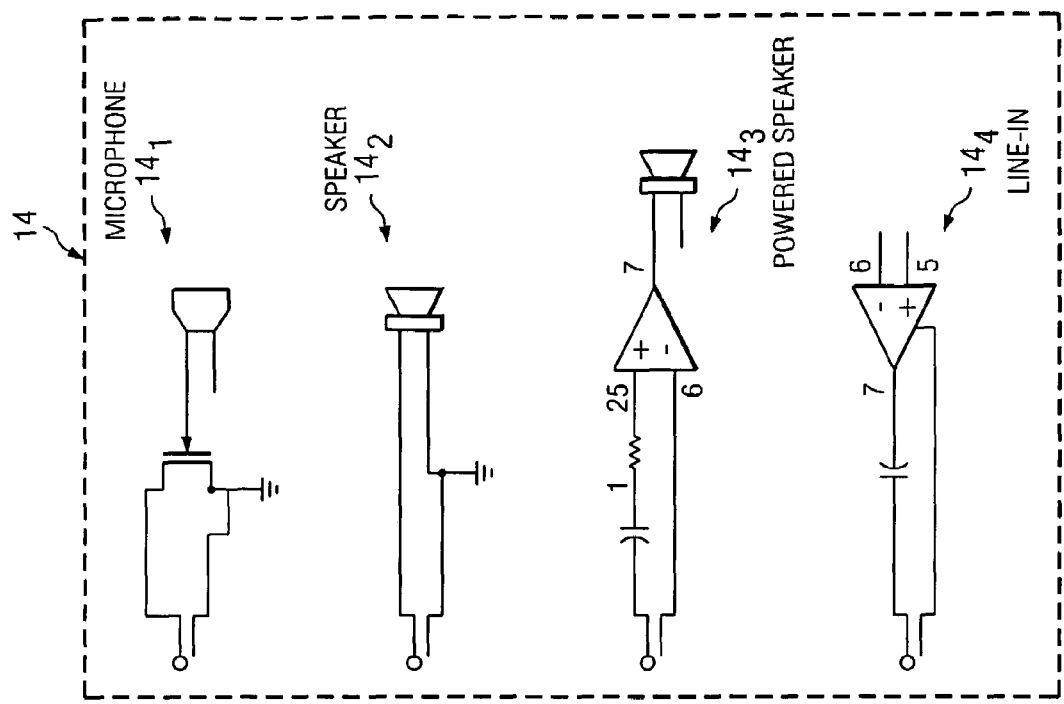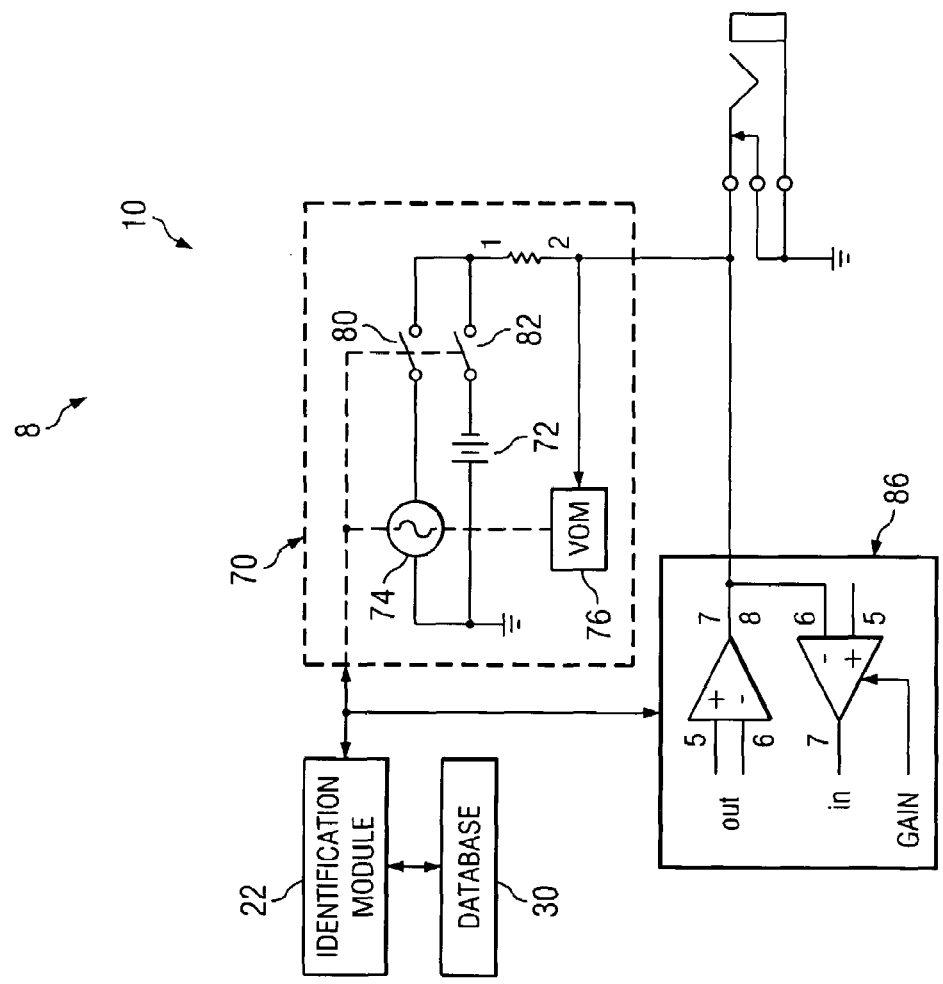
FIG. 2

DEVICE RECOGNITION SYSTEM AND METHOD

BACKGROUND OF THE INVENTION

Computer devices generally include input/output (I/O) ports or "jacks" for connecting to external devices such as a microphone, speaker, headset, etc. "Jack retasking" is where an I/O port is programmed to function as either an input or an output based on the external device connected therewith. For example, a direct current (DC) load associated with the external device is measured and, based on the load measurement, the I/O port "retasked" for the external device. However, different types of external devices often have load measurements associated therewith that are similar and/or indistinguishable, resulting in possible misapplication of "retasking" programming.

BRIEF DESCRIPTION OF THE DRAWINGS

For a more complete understanding of the present invention and the advantages thereof, reference is now made to the following descriptions taken in connection with the accompanying drawings in which:

FIG. 2 is a circuit diagram illustrating an embodiment of a device recognition system in accordance with the present invention.

DETAILED DESCRIPTION OF THE DRAWINGS

Figure 1:
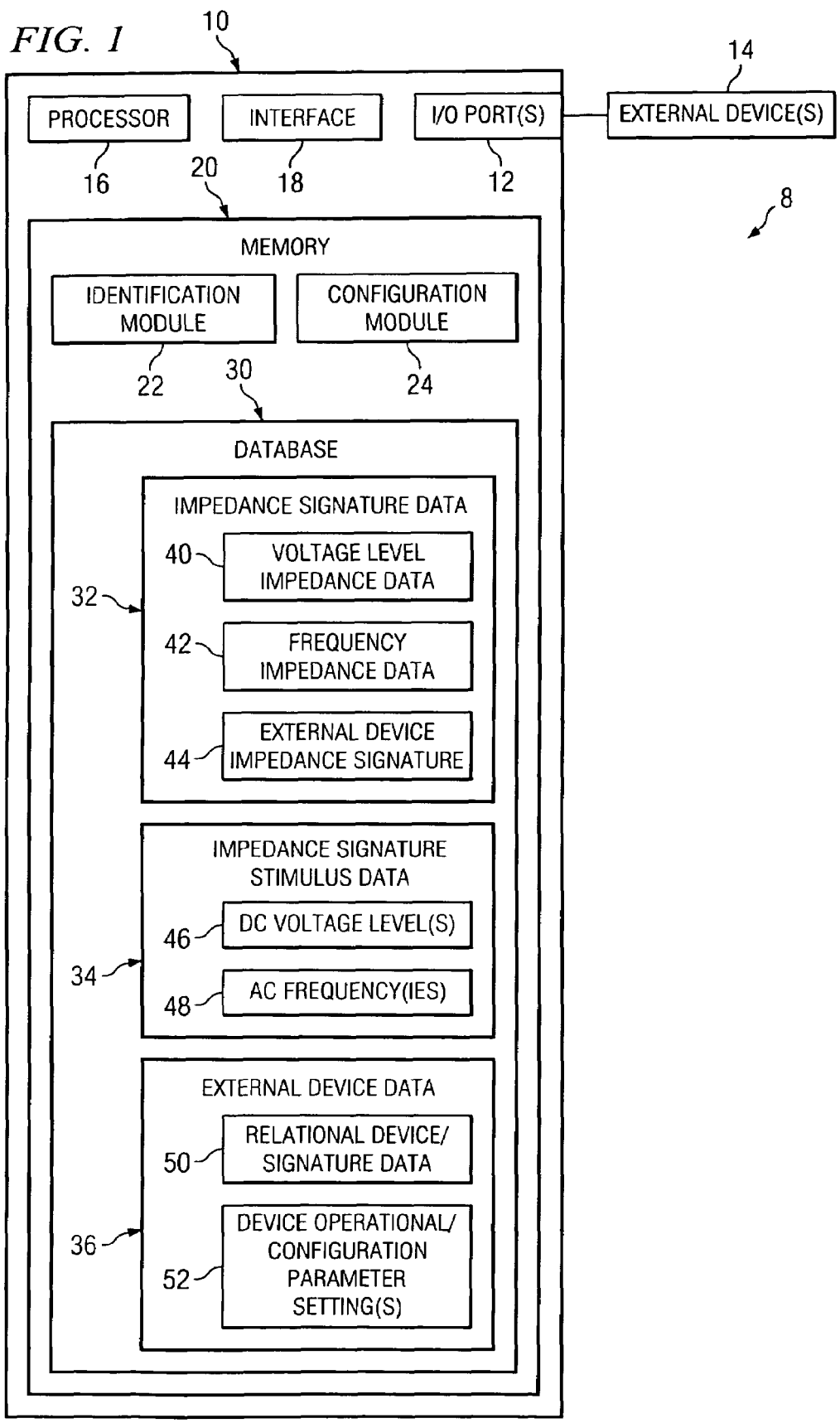
FIG. 1 is a block diagram illustrating an embodiment of a device recognition system in accordance with the present invention.
Figure 3A:
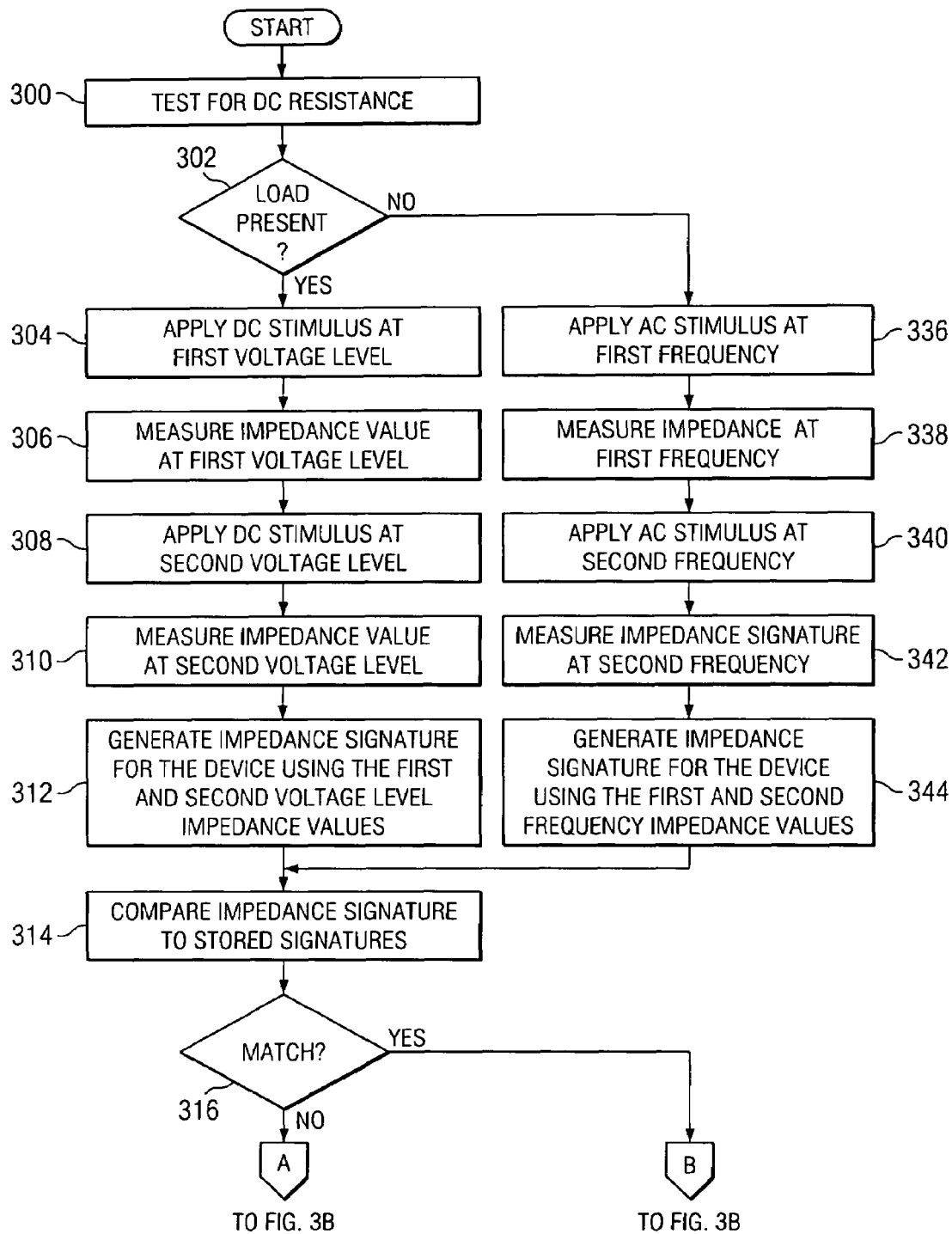
FIG. 3 is a flow diagram illustrating an embodiment of a device recognition method in accordance with the present invention.
Figure 3B:
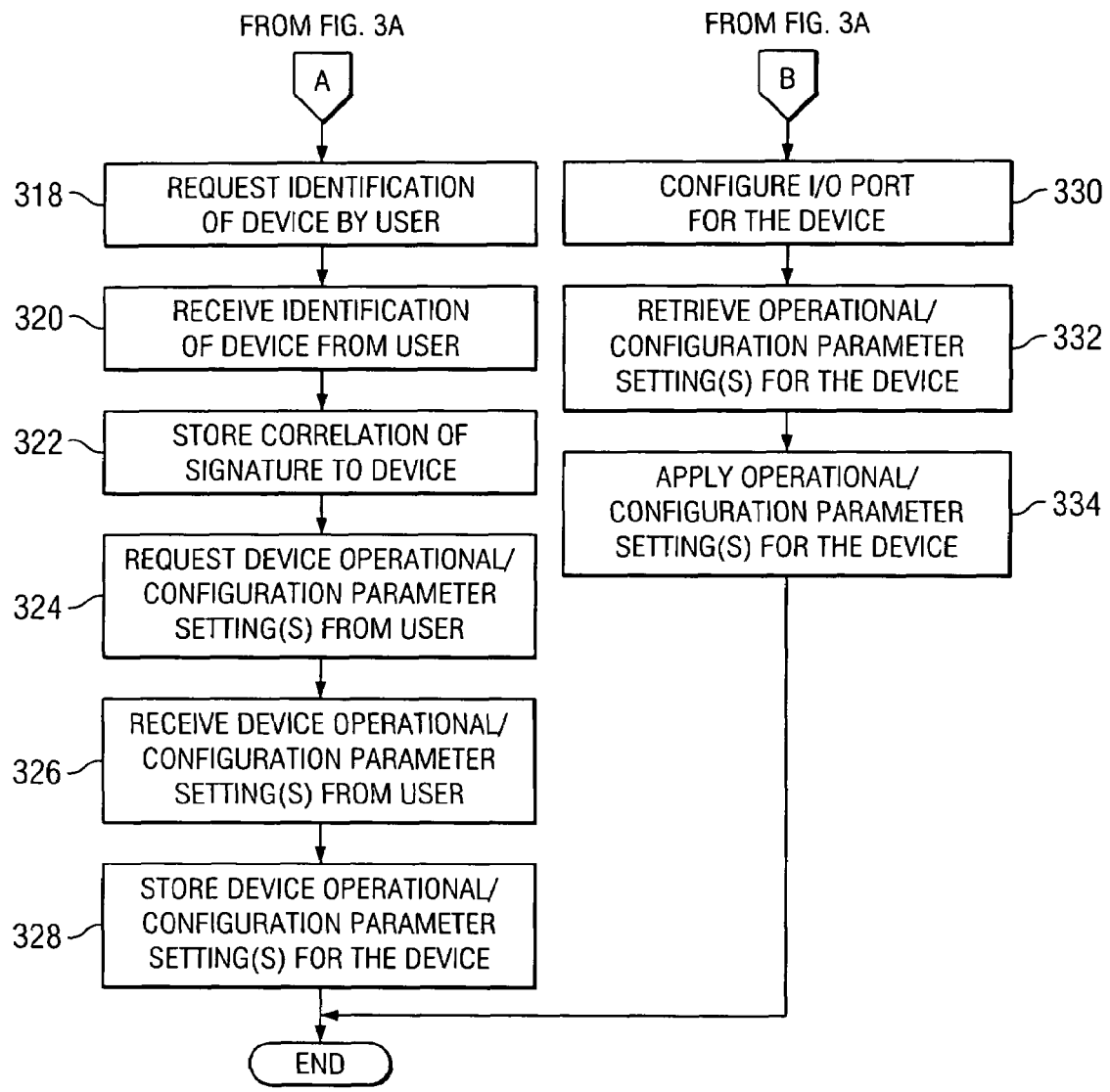

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a device recognition system 8 in accordance with the present invention. In the embodiment illustrated in FIG. 1, system 8 comprises a computer device 10 having at least one input/output (I/O) port 12 for coupling to at least one external device 14. Computer device 10 may compromise any type of device configured to accept and/or otherwise be connected to a variety of different types of external devices 14 such as, but not limited to, a microphone, headphone, amplified speaker, line-in device or otherwise. Embodiments of the present invention enable automatic recognition of a particular external device 14 connected to computer device 10 by computer device to enable automatic configuration of I/O port 12 for the particular external device 14 and, in some embodiments, automatic application of one or more operational settings for the particular external device 14.

In the embodiment illustrated in FIG. 1, computer device 10 comprises a processor 16, an interface 18 and a memory 20. Interface 18 may comprise any type of device for outputting information from computer device 10 to a user and/or receiving information from a user such as, but not limited to, a keypad, display, mouse, or other type of input and/or output element. In the embodiment illustrated in FIG. 1, computer device 10 also comprises an identification module 22 and a configuration module 24. Identification module 22 and configuration module 24 may comprise hardware, software, or a combination of hardware and software. In FIG. 1, identification module 22 and configuration module 24 are illustrated as being stored in memory 20 so as to be accessible and/or executable by processor 16. However, it should be understood that identification module 22 and/or configuration module 24 may be otherwise stored. Identification module 22 is used to determine and/or otherwise generate an impedance signature corresponding to external device 14 for identifying external device 14. Configuration module 24 is used to configure I/O port 12 coupled to external device 14 based on identification of the particular external device 14 by identification module 22 and/or configure or otherwise apply at least one operational and/or configuration parameter setting for the particular external device 14.

In the embodiment illustrated in FIG. 1, memory 20 comprises a database 30 having impedance signature data 32, impedance signature stimulus data 34, and external device data 36. Impedance signature data 32 comprises information associated with detected and/or measured impedance values of external device 14 by identification module 22 and an impedance signature generated for the particular external device 14 by identification module 22 using the detected impedance values. For example, in the embodiment illustrated in FIG. 1, impedance signature data 32 comprises voltage level impedance data 40, frequency impedance data 42 and external device impedance signature 44. Voltage impedance data 40 comprises information associated with impedance values measured and/or otherwise detected by identification module 22 corresponding to a particular external device 14 using different direct current (DC) voltage level stimuli. Frequency impedance data 42 comprises information associated with measured and/or otherwise detected impedance values by identification module 22 corresponding to a particular external device 14 using different alternating current (AC) frequency stimuli. External device impedance signature 44 comprises a unique impedance signature generated for the particular external device 14 by identification module 22 using the detected impedance values (e.g., either based on different DC voltage level stimuli or different frequency stimuli). Preferably, identification module 22 generates impedance signature 44 by combining, merging and/or otherwise mathematically or algorithmically manipulating at least two different impedance values of the external device responsive to at least two different applied stimuli (e.g., at least two different applied DC voltage levels or at least two different applied AC frequencies).

Impedance signature stimulus data 34 comprises information associated with different types and/or values of stimuli applied to a particular external device 14 for detecting and/or otherwise measuring a corresponding impedance of external device 14. For example, in the embodiment illustrated in FIG. 1, impedance signature stimulus data 34 comprises DC voltage levels 46 and AC frequencies 48. As described above, different DC voltage levels 46 and/or AC frequencies 48 are applied to a particular external device 14 for determining and/or otherwise measuring an impedance of the particular external device 14 using the applied stimuli. For example, in some embodiments of the present invention, identification module 22 causes application of at least two different DC voltage levels to the particular external device and measures an impedance of the external device at the two different DC voltage levels (e.g., 0.5 volt and 1.0 volt, 1 volt and 3 volts, etc.). Further, for example, in some embodiments of the present invention, identification module 22 causes application of at least two different AC frequencies to the particular external device and measures an impedance of the external device at the two different frequencies (e.g., 20 Hz and 1 kHz, 20 Hz and 20 kHz, etc.). It should be understood that a greater quantity of DC voltage levels or AC frequencies may be used for generating a unique impedance signature 44 for the particular external device 14.

External device data 36 comprises information associated with correlating an impedance signature 44 generated for a particular external device 14 to the particular external device 14 and/or information associated with various operational/configuration parameter settings for a particular external device 14. For example, in the embodiment illustrated in FIG. 1, external device data 36 comprises relational device/signature data 50 and device operational/configuration parameter settings 52. Relational device/signature data 50 comprises relational information correlating the generated impedance signature 44 for a particular external device 14 with identification information for the particular external device 14 to enable identification module 22 to automatically identify the particular external device based on the generated impedance signature 44. For example, relational device/signature data 50 comprises information correlating a particular impedance signature 44 to a particular external device 14 (e.g., a particular model microphone made by a particular manufacturer).

Device operational/configuration parameter settings 52 comprise information associated with various operating and/or configuration parameters associated with the particular external device 14. For example, if the particular external device 14 comprises a speaker, parameter settings 52 may comprise various operating parameters associated with the speaker such as, but not limited to, a desired volume setting, treble setting, base setting, balance setting, or otherwise. Device operational/configuration parameter settings 52 also comprise information associated with configuring I/O port 12 for the particular external device 14 (e.g., input only, output only, both input and output, etc.).

In operation, in response to coupling of a particular external device 14 to computer device 10, identification module 22 determines whether a DC resistance is present at the particular I/O port 12 corresponding to the connected external device 14. If a DC resistance is detected, identification module 22 applies at least two different DC voltage level stimuli to external device 14 to determine and/or otherwise measure an impedance value for each applied DC and voltage value stimulus. For example, in some embodiments of the present invention, identification module 22 accesses impedance signature stimulus data 34 to identify and/or otherwise select particular DC voltage levels 46 to apply to external device 14. Identification module 22 measures and/or otherwise detects an impedance value of external device 14 responsive to application of the DC voltage level 46 stimuli and uses the detected or determined impedance values to generate impedance signature 44 for the particular external device 14.

In some embodiments of the present invention, identification module 22 is configured to compare the impedance signature 44 generated for the particular external device 14 to relational device/signature data 50 to identify the particular external device 14. For example, if a unique impedance signature 44 has previously been generated and stored by computer device 10 for the particular external device 14, identification module 22 identifies the particular external device 14 based on a match between the generated impedance signature 44 and a previously stored impedance signature in relational device/signature data 50. If a unique impedance signature 44 has not been previously stored for the particular device (e.g., a first instance of the external device 14 being coupled to computer device 10), identification module 22 is configured to request input from a user for identification information for the particular external device 14 (e.g., whether the particular external device 14 is a speaker, microphone, powered speaker, etc., a particular model or manufacturer associated with the external device 14, and/or any other information used to uniquely identify the particular external device 14). In response to receiving identification information from a user corresponding to the particular external device 14, identification module 22 stores the identification information as relational device/signature data 50. Thus, in operation, in response to a subsequent attachment of the particular external device 14 to computer device 10, identification module 22 is configured to automatically identify the particular external device 14 based on relational device/signature data 50 for the particular external device 14 and the impedance signature 44 generated for the device 14.

As described above, in response to detecting coupling of a particular external device 14 to computer device 10, identification module 22 determines whether an DC resistance is present at I/O port 12 corresponding to the connected external device 14. If an appreciable DC resistance is not detected at I/O port 12 corresponding to the connected external device 14, identification module 22 applies at least two different AC frequency stimuli to the particular external device 14 for measuring and/or otherwise determining an impedance response based on the applied frequency stimuli. For example, in some embodiments of the present invention, identification module 22 accesses frequency impedance data 42 to identify and/or otherwise select at least two different AC frequency stimuli 42 to apply to the particular external device 14. Identification module 22 uses the measured and/or otherwise detected impedance values responsive to application of the frequency impedance stimuli 42 to generate a unique impedance signature 44 for the particular external device 14.

As described above, identification module 22 accesses relational device/signature data 50 to determine whether the generated impedance signature 44 for the particular external device 14 matches and/or otherwise corresponds to a previously stored impedance signature 44. For example, if the unique impedance signature 44 associated with the particular external device 14 has not been previously stored as relational device/signature data 50, identification module 22 requests input from a user for identification information for the particular external device 14 and stores such identification information as relational device/signature data 50 correlated to the generated impedance signature 44 for the particular external device 14. If an impedance signature 44 stored in relational device/signature data 50 corresponds to and/or otherwise matches the impedance signature 44 generated for the particular external device 14, identification module 22 automatically identifies the particular external device 14 based on the stored impedance signature 44.

In response to identifying the particular external device 14 coupled to computer device 10, configuration module 24 configures I/O port 12 for the particular external device 14 (e.g., input data stream, output data stream, input and output data stream, etc.). In some embodiments of the present invention, configuration module 24 also accesses device operational/configuration parameter settings 52 for the identified external device 14 and automatically applies such settings 52 for the external device 14. For example, as described above, operational settings generally associated with the particular external device 14 (e.g., volume settings, frequency levels, or other operational and/or configuration settings associated with the particular external device 14) are automatically configured and/or applied, either in hardware, software, or both, by configuration module 24.

FIG. 2 is a circuit diagram illustrating an embodiment of device recognition system 8 in accordance with the present invention. In the embodiment illustrated in FIG. 2, computer device 10 comprises an impedance measurement circuit 70 having a DC voltage source 72, an AC signal generator 74, and a voltage measurement device or voltmeter 76. Preferably, DC voltage source 72 is configured having a programmable and/or variable output voltage to enable application of at least two different DC voltage level stimuli 46 (FIG. 1) to a particular external device 14. Additionally, preferably, AC signal generator 74 is configured to output different frequencies to enable application of at least two different AC frequency stimuli 48 (FIG. 1) to a particular external device 14. In the embodiment illustrated in FIG. 2, switches 80 and 82 are actuatable by identification module 22 for applying either DC voltage stimuli 46 or AC frequency stimuli 48 to a particular external device 14. In the embodiment illustrated in FIG. 2, a plurality of different types of external devices 14 are illustrated (e.g., a microphone 141, a speaker 142, a powered speaker 143, and a line-in device 144). However, it should be understood that other types of external devices 14 may be connected with and/or otherwise coupled to computer device 10.

Thus, in operation, identification module 22 applies DC voltage level 46 stimuli or AC frequency 48 stimuli to a particular external device 14 to enable measurement of an impedance value associated with the particular external device 14 by voltmeter 76. Based on the measured impedance values responsive to the applied stimuli to the particular external device 14, identification module 22 generates a unique impedance signature 44 for the particular external device 14. In the embodiment illustrated in FIG. 2, computer device 10 comprises a device-related module 86 associated with the particular external device 14 such as, but not limited to, an audio codec, media application, or other type of hardware and/or software element generally associated with data input/output corresponding to the particular external device 14. In operation, in response to identifying the particular external device 14 based on the unique impedance signature 44, configuration module 24 (FIG. 1) configures I/O port 12 corresponding to the particular external device 14 and/or configures device-related module 86 corresponding to the identified external device 14. For example, device-related module 86 may comprise hardware, software or a combination of hardware and software for controlling various operational parameter settings associated with the particular type of external device 14 (e.g., bass level, treble level, balance levels, etc.). Accordingly, in some embodiments of the present invention, configuration module 24 (FIG. 1) automatically applies device operational/configuration parameter settings 52 (FIG. 1) corresponding to the particular external device 14 based on identification of the particular external device 14.

FIG. 3 is a flow diagram illustrating an embodiment of a device recognition method in accordance with the present invention. The method begins at block 300, where identification module 22 tests and/or otherwise determines a presence of a DC resistance at I/O port 12 connected with a particular external device 14. At decisional block 302, a determination is made whether a load is present at the particular I/O port 12. If a load is present at the particular I/O port 12, the method proceeds to block 304, where identification module 22 applies a first DC voltage level stimulus 46 to the external device 14. At block 306, identification module 22 measures an impedance value of the particular external device 14 responsive to the applied DC voltage level stimulus 46. At block 308, identification module 22 applies a second different DC voltage level stimulus 46 to the particular external device 14. At block 310, identification module 22 measures an impedance value corresponding to the particular external device 14 responsive to the application of the second DC voltage level stimulus 46.

At block 312, identification module 22 generates a unique impedance signature 44 for the particular external device 14 by combining and/or otherwise using the first and second DC voltage level stimuli 46 applied at blocks 304 and 308. At block 314, identification module 22 accesses relational device/signature data 50 and compares the generated impedance signature 44 with relational data stored as data 50. At decisional block 316, a determination is made whether the generated impedance signature 44 matches a previously stored impedance signature. If the impedance signature 44 generated at block 312 does not match a previously stored impedance signature, the method proceeds to block 318, where identification module 22 requests input from a user of identification information for the particular external device 14. At block 320, identification module 22 receives the identification information from the user for the particular external device 14. At block 322, identification module 22 stores the identification information as relational device/signature data 50 correlated to the impedance signature 44 generated at block 312.

At block 324, configuration module 24 requests input from the user of operational and/or configuration parameter settings 52 for the particular external device 14. At block 326, configuration module 24 receives operational and/or configuration parameter settings 52 for the particular external device 14 and, at block 328, stores settings 52 in database 30 correlated to the particular external device 14 (e.g., based on the impedance signature 44 generated at block 312).

If at decisional block 316 a determination is made that the impedance signature 44 generated at block 312 matches a previously stored impedance signature based on relational device/signature data 50, the method proceeds to block 330 where identification module 22 identifies the particular external device 14, and configuration module 24 automatically configures I/O port 12 for the particular external device 14. At block 332, configuration module 24 accesses and/or otherwise retrieves device operational configuration parameter settings 52 associated with the particular external device 14. At block 334, configuration module 24 applies settings 52 for the particular external device 14.

If at decisional block 302, a load is not detected at I/O port 12, the method proceeds to block 336, where identification module 22 applies a first AC frequency stimulus 48 to the particular external device 14. At block 338, identification module 22 measures an impedance value associated with the particular external device 14 responsive to application of the AC frequency stimulus 48 applied at block 336. At block 340, identification module 22 applies a second different AC frequency stimulus 48 to the particular external device 14. At block 342, identification module 22 measures an impedance value of the particular external device 14 responsive to application of the second AC frequency stimulus 48 applied at block 340. At block 344, identification module 22 generates an impedance signature 44 for the particular external device 14 using and/or otherwise combining the impedance values measured responsive to application of the AC frequency stimuli 48 applied at blocks 336 and 340. The method proceeds to block 314 where the generated impedance signature 44 is compared to relational data 50 to identify the particular external device 14.

Thus, embodiments of the present invention enable a unique impedance signature 44 to be generated for an external device 14 based on application of a plurality of different impedance stimuli to the external device 14, thereby enabling automatic identification of external devices 14 coupled to the computer device 10. Further, embodiments of the present invention enable input from a user to the computer device 10 of identification associated with the external device 14 to facilitate correlation of the identification information to the generated impedance signature 44. Moreover, embodiments of the present invention enable input from a user to the computer device 10 of operational and/or configuration settings 52 for the particular external device 14, thereby enabling automatic application of such settings 53 in response to identification of the external device 14.

What is claimed is:

1. A device recognition system, comprising:
   an identification module of a computer device configured to:
      determine whether a direct current (DC) resistance is present at an I/O port to which an external device is connected;
      if the DC resistance is present, apply a DC voltage stimulus to the external device or if the DC resistance does not meet a predetermined level, apply an AC frequency stimulus to the external device; and
      generate an impedance signature for the external device using an impedance of the external device measured after applying the DC voltage stimulus or the AC frequency stimulus, the impedance signature used to identify the external device.

2. The system of claim 1, wherein the identification module is configured to compare the impedance signature to relational device/signature data stored in a database to identify the external device.

3. The system of claim 1, wherein the identification module is configured to request from a user identification information for the external device.

4. The system of claim 1, wherein the identification module is configured to store identification information for the external device received from a user correlated to the impedance signature.

5. The system of claim 1, further comprising a configuration module configured to apply at least one operational parameter setting for the external device based on the impedance signature.

6. The system of claim 1, further comprising a configuration module adapted to configure an input/output port coupled to the external device based on the impedance signature.

7. The system of claim 1, further comprising a configuration module configured to request input from a user of at least one operational parameter setting for the external device.

8. The system of claim 7, wherein the configuration module is configured to store the at least one operational parameter setting correlated to the external device.

9. The system of claim 1, wherein the identification module is configured to apply at least two different DC voltage levels as the DC voltage stimulus.

10. The system of claim 1, wherein the identification module is configured to apply at least two different alternating current (AC) frequencies as the AC frequency stimulus.

11. A device recognition method, comprising:
    determining whether a direct current (DC) resistance is present at an I/O port to which an external device is connected;
    if the DC resistance is present, applying a DC voltage stimulus to the external device or if the DC resistance does not meet a predetermined level, applying an AC frequency stimulus to the external device; and
    generating an impedance signature for the external device using an impedance of the external device measured after applying the DC voltage stimulus or the AC frequency stimulus where the impedance signature is used to identify the external device by a computer device.

12. The method of claim 11, further comprising comparing the impedance signature to relational device/signature data stored in a database to identify the external device.

13. The method of claim 11, where the applying the DC voltage stimulus further comprises applying at least two different DC voltage stimuli; and
    where applying the AC frequency stimulus comprises applying at least two different AC frequency stimuli.

14. The method of claim 11, further comprising combining the impedance measured by applying at least two different stimuli to generate the impedance signature.

15. The method of claim 11, further comprising storing identification information for the external device received from a user correlated to the impedance signature.

16. The method of claim 11, further comprising applying at least one operational parameter setting for the external device based on a device identity correlated with the impedance signature.

17. The method of claim 11, further comprising configuring an input/output port coupled to the external device based on the impedance signature.

18. The method of claim 11, further comprising requesting input from a user of at least one operational parameter setting for the external device.

19. The method of claim 18, further comprising storing the at least one operational parameter setting correlated to the external device.

20. The method of claim 11, wherein applying the DC voltage stimulus comprises applying at least two different DC voltage levels.

21. The method of claim 11, wherein applying the AC frequency stimulus comprises applying at least two different alternating current (AC) frequencies.

22. A device recognition system, comprising:
    means for determining whether a direct current (DC) resistance is present at an I/O port to which an external device is connected;
    means for applying a DC voltage stimulus to the external device if the DC resistance is present, and applying an AC frequency stimulus to the external device if the DC resistance does not meet a predetermined value; and
    means for generating an impedance signature for the external device using an impedance of the external device measured after applying the DC voltage stimulus or the AC frequency stimulus, the impedance signature used to identify the external device by a computer device using an impedance signature associated with the external device stored in a database.

23. The system of claim 22, further comprising means for requesting from a user identification information for the external device.

24. The system of claim 22, further comprising means for applying at least one operational parameter setting for the external device based on the impedance signature.

25. The system of claim 22, wherein the means for applying DC voltage stimulus comprises means for applying at least two different direct current (DC) voltage levels.

26. The system of claim 22, wherein the means for applying AC frequency stimulus comprises means for applying at least two different alternating current (AC) frequencies.

27. A device recognition system, comprising:
an identification module of a computer device configured to:
- determine whether a direct current (DC) resistance is present at an I/O port to which an external device is connected;
- if the DC resistance is present, apply at least two different DC voltage stimuli to the external device, or if the DC resistance does not meet a predetermined level, apply at least two different AC frequency stimuli to the external device; and
- use the at least two different DC voltage stimuli or the at least two different AC frequency stimuli in measuring an impedance of the external device coupled to the computer device, the identification module configured to receive from a user identification information for the external device.

28. The system of claim 27, wherein the identification module is configured to use the received identification information to identify the external device on a subsequent coupling of the external device to the computer device and store the received information in a database correlated with the impedance of the external device.

29. The system of claim 27, wherein the identification module is configured to request input by the user of the identification information.

30. The system of claim 27, further comprising a configuration module configured to apply at least one operational parameter setting for the external device based on identification of the external device by the identification module.

31. The system of claim 27, further comprising a configuration module adapted to configure an input/output port coupled to the external device based on identification of the external device by the identification module.

32. The system of claim 27, further comprising a configuration module configured to request input from a user of at least one operational parameter setting for the external device.

* * * * *